US009927289B2

(12) United States Patent
Fest (10) Patent No.: US 9,927,289 B2
(45) Date of Patent: Mar. 27, 2018

(54) POLARIZATION FILTERING FOR WINDOW SELF-EMISSION DUE TO AERO-THERMAL HEATING

(71) Applicant: Raytheon Company, Waltham, MA (US)

(72) Inventor: Eric C. Fest, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 188 days.

(21) Appl. No.: 14/921,774

(22) Filed: Oct. 23, 2015

(65) Prior Publication Data

US 2017/0115160 A1    Apr. 27, 2017

(51) Int. Cl.
| | |
|---|---|
| *F41G 7/22* | (2006.01) |
| *G01J 1/04* | (2006.01) |
| *B64C 1/14* | (2006.01) |
| *F42B 10/46* | (2006.01) |
| *G01S 3/781* | (2006.01) |

(52) U.S. Cl.
CPC .......... *G01J 1/0429* (2013.01); *B64C 1/1484* (2013.01); *F41G 7/2253* (2013.01); *F41G 7/2293* (2013.01); *F42B 10/46* (2013.01); *G01S 3/781* (2013.01)

(58) Field of Classification Search
CPC ........ F41G 7/22; F41G 7/2253; B64C 1/1484
USPC ....................... 250/342; 244/3.16; 359/226.2
See application file for complete search history.

(56) References Cited

U.S. PATENT DOCUMENTS

| | | |
|---|---|---|
| 5,135,183 A | 8/1992 | Whitney |
| 8,466,964 B2 | 6/2013 | Gat et al. |
| 9,696,117 B2 * | 7/2017 | Miller ..................... F41G 7/008 |
| 2007/0045545 A1 * | 3/2007 | Light ........................ G01J 3/02 |
| | | 250/342 |
| 2010/0127174 A1 | 5/2010 | Tener et al. |
| 2012/0111992 A1 | 5/2012 | Fry |

(Continued)

OTHER PUBLICATIONS

Tyo, J. Scott, "Design of optimal polarimeters: maximization of signal-to-noise ratio and minimization of systematic error," Applied Optics, Feb. 1, 2002, vol. 41, No. 4, pp. 619-630.

(Continued)

*Primary Examiner* — Kevin Pyo
(74) *Attorney, Agent, or Firm* — Eric A. Gifford (57) ABSTRACT

In flight vehicles subject to extreme aero-thermal heating of the optical window, the optical system is configured to look through an off-axis segment of the optical window and a polarizer is positioned in the optical path between the off-axis segment and the detector. The polarizer comprises at least one filter pixel that imparts a linear polarization of a certain angular value to filter the incident radiation as a function of its polarization. In the case of a sheet polarizer, the entire polarizer is aligned to the plane of incidence. The sheet polarizer preferentially filters the target radiation to increase the SNR at the detector. In the case of a microgrid polarizer, at least one and preferably multiple filter pixels in each sub-array aligned to the plane of incidence. The microgrid polarizer can produce data products including a radiance image, an AoLP image and a DoLP image, only the AoLP image removes the self-emitted window radiance and an gradient caused by non-uniform aero-thermal heating.

23 Claims, 10 Drawing Sheets

(56) References Cited

U.S. PATENT DOCUMENTS

2014/0063299 A1  3/2014  Fest et al.
2015/0022874 A1  1/2015  Martin et al.

OTHER PUBLICATIONS

Hirakawa et al., "Fourier domain design of microgrid imaging polarimeters with improved spatial resolution," Proc. of SPIE, vol. 9099, 2014.

Sabatke et al., "Figures of merit for complete Stokes polarimeter optimization," Proc. of SPIE, vol. 4133, 2000, pp. 75-81.

Tyo, J. Scott, "Optimizing imaging polarimeters constructed with imperfect optics," Applied Optics, Aug. 1, 2006, vol. 45, No. 22, pp. 5497-5503.

Armstrong et al., "Non-uniformity correction for improved registration and high-resolution image reconstruction in IR imagery," Part of the SPIE Conference on Applications of Digital Image Processing XXII, Denver, CO,J199,PI vol. 3808, pp. 150-161.

\* cited by examiner

SHEET
POLARIZER

FIG.8b

MICROGRID
POLARIZED

FIG.8c

TRANSMISSIVE
ELEMENT

POLARIZATION FILTERING FOR WINDOW SELF-EMISSION DUE TO AERO-THERMAL HEATING

BACKGROUND OF THE INVENTION

Field of the Invention

This invention relates to optical systems for use with flight vehicles subject to extreme aero-thermal heating in which window self-emission reduces the signal-to-noise ratio (SNR) of sensed target emissions complicating the task of target tracking.

Description of the Related Art

Optical systems for use with flight vehicles such as guided missiles or belly-mounted sensor pods on aircraft typically include an optical window (e.g., a dome) that protects the sensitive optical and electrical components. The optical window is transparent in a desired spectral band (e.g., the MWIR band from 3-5 microns) to pass emissions from a target in a scene through the optical window to the entrance pupil of focusing optics, which in turn route the incident radiation along an optical path and focus the radiation onto a detector. The detector may, for example, be a quad-cell detector for non-imaging applications such as spot tracking. The detector may, for example, be a focal plane array (FPA) for various imaging applications. The FPA generally includes an array of pixels, each pixel including a photo-detector that generates a signal responsive to the intensity of the incident. These signals are collected and combined to form a digital image of the object. The focusing optics may be fixed or gimbaled to increase the field-of-regard (FOR). Typically, the entrance pupil is symmetric about the central axis of symmetry of the optical window. Alternately, the entrance pupil may be offset such that the FOR does not cross the tip of the optical window to reduce distortion (See U.S. Pub. No. 2015/0022874).

Ideally, the only emissions sensed by the detector are those from the scene and particularly a specified target. However, in guided missiles or sensor pods there can be many different sources of parasitic radiation or "noise" that reduces the SNR of the target and the ability of the guidance unit to track the target. One such source is the self-emission of the optical window that may occur due to aero-thermal heating as the missile or pod travels through the atmosphere. The amount of aero-thermal heating depends on the flight speeds, aerodynamic design of the window that induces heating and the thermal design of the window that removes heat to cool the window. The window self-emissions can raise the general background noise or can induce a gradient in the detected signal (due to non-uniform heating of the window). In many instances, the self-emissions due to aero-thermal heating are insignificant. In others, it is desirable to try to mitigate the effects of window self-emissions.

One approach is to spectrally filter the incident radiation. Generally speaking, the temperature of the aero-thermally heated optical window is much higher than the temperature of the target. As such, the emissions of the target and the optical window will have different spectral characteristics. For example, the relative intensity of the window emissions will be stronger at the longer wavelengths in the MWIR band. Low-pass filtering the incident radiation can improve the contrast of the target radiation (signal) to the window self-emitted radiation (noise). See, for example, U.S. Pat. No. 8,466,964 entitled "Multispectral Uncooled Thermal Infrared Camera System" issued Jun. 18, 2014.

Non-uniform aero-thermal heating can induce a gradient in the window self-emissions, hence the total detected incident radiation. This gradient is a form of "fixed-pattern noise". One way to remove this fixed pattern noise is by using Scene based Non-Uniformity Correction (NUC), in which the scene is intentionally blurred and the resulting image is recorded and then subtracted from non-blurred images of the scene. The blurring is usually done by moving an optical element, such as a lens, prism, or diffuser, into the beam, though some scene-based NUCing methods are completely software-based. The advantage of scene based NUC (as opposed to other NUCing methods, such as the use of a shutter in front of the detector) is that is can correct for contributions to fixed-pattern noise from every optical element in the system, including windows and domes. The disadvantage is that the method of blurring must be carefully designed so that the target is not inadvertently subtracted from the final image. See E. E. Armstrong, M. M. Hayat, R. C. Hardie, S. Torres, and B. Yasuda, "Non-uniformity Correction for Improved Registration and High-Resolution Image Reconstruction in IR Imagery," Proceedings of SPIE's Annual Meeting, Application of Digital Image Processing XXII, Denver Colo., Jul. 18-23, 1999.

Polarimeters can be used to analyze the polarization components of light to, for example, extract shape information from an object. Some polarimeters use two or more linear polarizers (polarized pixels) that filter at least half of the incoming light and direct the remaining light to a focal plane. As a result, the brightness of the image at the focal plane is substantially reduced (e.g., by about half).

Polarimetry requires at least three measurements to analyze the polarization components of light; at least two different polarization components and possibly an unpolarized component. Typically, the pixelated filter array, and FPA, are divided into groups of four pixels (e.g., a 2×2 sub-array of pixels). The standard commercially available pixelated filter array is a 2×2 array of linear polarizers having angular values of $\Theta_1=0°$, $\Theta_2=45°$, $\Theta_3=90°$ and $\Theta_4=135°$, respectively, which are optimum assuming perfect alignment between the pixelated filter array and the FPA. U.S. Patent Publication 2014/0063299 to Fest et. al. entitled "Movable Pixelated Filter Array" describes a technique for using the data reduction matrix to account for misalignment. The electronics may compute an Angle of Linear Polarization (AoLP) image and a Degree of Linear Polarization (DoLP) image from the four linearly polarized pixel values in each grouping to extract shape information. The electronics may also compute an average of the four detector pixels in each grouping to form a reduced resolution intensity image.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an optical system for use with flight vehicles subject to extreme aero-thermal heating in which window self-emission reduces the SNR of sensed target emissions complicating the task of target tracking. In an off-axis optical system, fixed or gimbaled, target radiation passes through both the inner and outer surfaces of an off-axis segment of the optical window, each of which induces a P-polarization to the radiation whereas the self-emitted radiation from the window only passes through the inner surface of the optical window. As a result, the target radiation is more P-polarized than the self-emitted radiation.

A polarizer is positioned in the optical path between the optical window and a detector (e.g., a FPA or quad-cell). The polarizer comprises at least one filter pixel that imparts a linear polarization of a certain angular value to filter the incident radiation as a function of the polarization of the incident radiation. At least one filter pixel is aligned to the P-polarization in the plane of incidence. If the polarizer is a sheet polarizer (effectively one large filter pixel), the sheet polarizer is aligned to the P-polarization in the plane of incidence. If the polarizer is a microgrid polarizer, at least one filter pixel and preferably multiple filter pixels in each sub-array are aligned to the P-polarization in the plane of incidence. This improves the SNR of the detected target radiation. In the case of the microgrid polarizer, the AoLP image removes the effects of non-uniform aero-thermal heating. The sheet polarizer may be used with imaging or non-imaging detectors whereas the microgrid polarizer is only applicable for imaging detectors such as a FPA.

In an embodiment, the flight vehicle is propelled toward the target at supersonic speeds in excess of Mach 1 and, in some applications, hypersonic speeds in excess of Mach 5.

In different embodiments, a sheet polarizer passes P-polarized radiation thereby modulating the intensity of incident radiation as a function of its P-polarization and increasing a contrast ratio of target radiation to self-emitted radiation. In a fixed optical system, the sheet polarizer can be positioned at any point along the optical path between the optical window and the detector. In a gimbaled optical system, the sheet polarizer can be positioned off-gimbal or at any position on the inner gimbal. If off gimbal, the gimbal is rotated to align the plane of incidence to the sheet polarizer to read out the detector signals. Alternately, the sheet polarizer could be a dynamic microgrid array electronically controlled to present a single linear polarization that tracks the rotation of the gimbal. If on-gimbal, the sheet polarizer is mounted in alignment to the P-polarization in the plane of incidence and remains aligned as the gimbal rotates.

In different embodiments, a microgrid polarizer array having a plurality of polarized pixelated filter sub-arrays is positioned at the FPA or an intermediate image (conjugate plane) of the focal plane. Each sub-array comprises three or more filter pixels Q of which at least two filter pixels impart a linear polarization of a certain and different angular value. The microgrid polarizer is mounted such that at least one of the filter pixels (preferably multiple) in each sub-array is aligned to the P-polarization in the plane of incidence. In a fixed optical system, the microgrid polarizer is positioned at the FPA or at an intermediate image of the focal plane. In a gimbaled optical system, the microgrid polarizer can be positioned off-gimbal at the FPA or at an intermediate image of the focal plane on the inner gimbal. If off gimbal, the gimbal is rotated to align the plane of incidence to the one or more designated filter pixels to read out the FPA signals. Alternately, the microgrid polarizer could be a dynamic microgrid array electronically controlled to present the sub-array of filter pixels that tracks the rotation of the gimbal. If on-gimbal, the microgrid polarizer is mounted to align the plane of incidence to the one or more designated filter pixels and remains aligned as the gimbal rotates.

In different embodiments of the microgrid polarizer, a processor is configured to read out and process groupings of FPA pixels to compute data products including an AoLP image and possibly a DoLP image and an intensity image. The electronics may use only the AoLP image to track targets as the AoLP image is the only data product to remove effects of the aero-thermal heating, and particularly non-uniform heating.

In different embodiments, the polarizer is a dynamic microgrid array having a plurality of switchable polarized filter pixels. In different embodiments, the dynamic microgrid array is configurable alternately as a sheet polarizer, a microgrid polarizer or as an unpolarized transmissive element.

In an embodiment, a shutter mechanism is configured to selectively move either a sheet polarizer or a microgrid polarizer into the optical path.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an optical system for use with flight vehicles subject to extreme aero-thermal heating in which window self-emission reduces the SNR of sensed target emissions complicating the task of target tracking. Supersonic (>Mach 1) and more so hypersonic (>Mach 5)

weapons may produce such extreme aero-thermal heating of the window. Spectral filtering techniques may be effective to increase the SNR, however, in some systems, such techniques by themselves are not sufficient. The present invention provides a technique based on exploiting the polarization of the target and self-emitted radiation to lower the background window emission or to remove a gradient due to non-uniform heating.

Figure 1A:
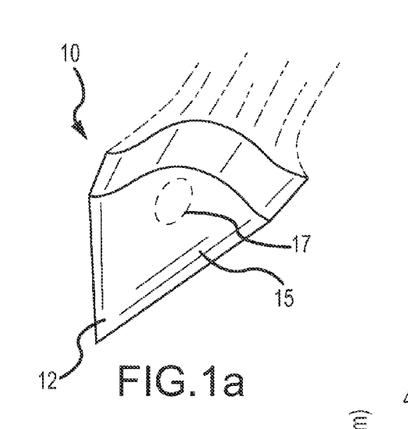
FIGS. 1a, 1b and 1c are diagrams of a hypersonic missile, a plot of radiance vs. wavelength of a target and an aero-thermal heated optical window of the hypersonic missile and a plot of the integrated radiance over a 3-5 micron MWIR band, respectively.
Figure 1B:
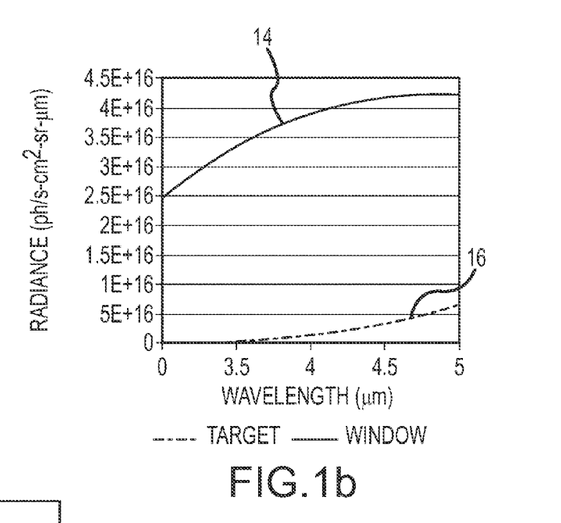
Figure 1C:
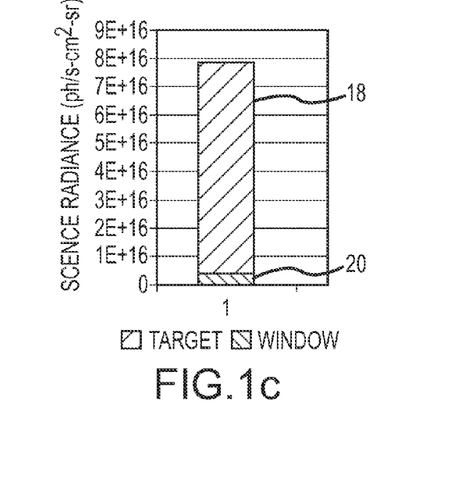

Referring now to FIGS. 1a, 1b and 1c, in an embodiment a hypersonic weapon 10 is subject to extreme aero-thermal heating of its optical window 12 when travelling at hypersonic speeds through the atmosphere. The weapon comprises an airframe 15 and a propulsion system 17 such as a liquid or solid rocket motor configured to propel the weapon toward the target in excess of Mach 5. The temperature of the optical window is typically much higher than the temperature of a target. Consequently, the level of emissions 14 from optical window 12 is much higher than the level of emissions 16 from the target across the entire MWIR band from 3-5 microns. The integrated radiance 18 of the optical window over the MWIR band is several times the integrated radiance 20 of the target.

Target trackers require a certain minimum SNR to reliably track a target. For example, according to M. Mallick and V. Krishnamurthy, "Integrated Tracking, Classification, and Sensor Management", Wiley (2012) a minimum SNR of 12 dB (=~15) is required to track a target. Some trackers require a higher SNR, some less. In the illustrated example, the SNR would not surpass the minimum required for tracking. Since the emissions levels of the optical window dominate the target emissions across the MWIR, conventional spectral filtering would be ineffective.

Figure 2A:
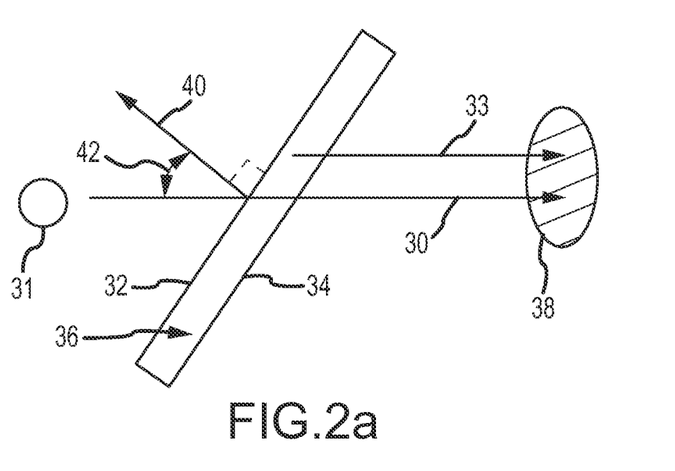
FIGS. 2a and 2b are a diagram of target radiation through and self-emitted radiation from an optical window and the percent polarization of the target radiation and self-emitted radiation as a function of angle of incidence, respectively.

Referring now to FIGS. 2a and 2b, light 30 from a distant target 31 passes through both an outer surface 32 and an inner surface 34 of a tilted optical window 36, representative of an off-axis portion of the hypersonic weapon's optical window. The aero-thermal heated window self-emits light in all directions. A portion of window light 33 is emitted in the same direction as the incident target light 30 and passes through only inner surface 34.

A plane of incidence 38 is defined as the plane that contains the incident ray (light 30) and a normal 40 to the surface of the window. If the outer and inner surfaces have the same symmetry (as they often do), the planes of incidence of the two surfaces are coincident.

The Fresnel equations describe the behavior of light when moving between media of differing refractive indices such as between the optical window and air. According to the Fresnel equations, the transverse electric field of light that is p-polarized oscillates in the plane of incidence 38. The electric field of s-polarized light oscillates perpendicular to the plane of incidence. According to the equations, a majority of the incident energy is p-polarized.

The degree to which the light is p-polarized is most strongly affected by the angle-of-incidence (AOI) 42 between the target light 30 and the surface normal 40, and to a lesser effect the refractive index difference between window material and air. The greater the AOI, the greater the p-polarization of the light.

Figure 2B:
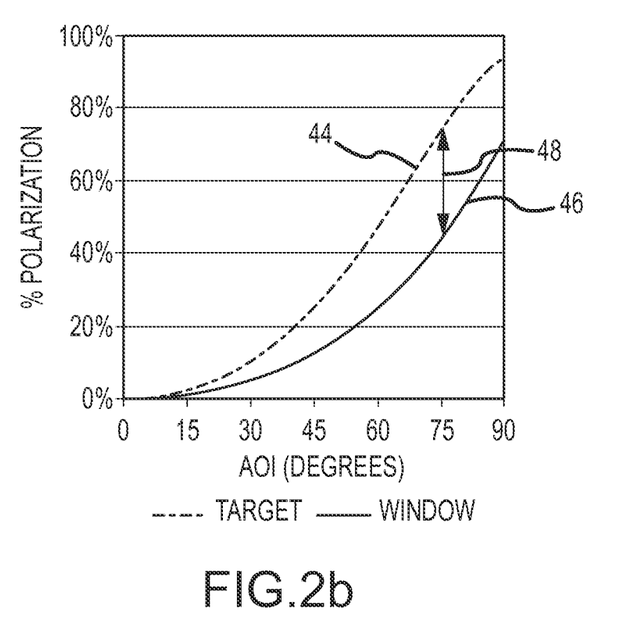

As depicted in FIG. 2b, for a given AOI, the p-polarization 44 of the target light is greater than the p-polarization 46 of the window light. The p-polarization difference 48 between the two curves increases (to a point) with an increasing AOI. This difference is a result of the target light 30 passing through both the inner and outer surfaces, and thus twice transitioning between the window media and air, and the window light 33 passing through only the inner surface, and thus transitioning between the window media and air only once.

A typical target gives off a thermal signature in the MWIR band that is a combination of unpolarized and polarized light. The tilted window 36 induces a p-polarization bias to the unpolarized component of thermal signal 30 that is stronger than the polarized component of the signal 33. Note this is only true if the entrance pupil of the optical system is positioned to look through an off-axis segment of the window. If the optical system is a more typical on-axis system, the light will not have a predominant p-polarization state because the rotational symmetry of the optical window will cancel the induced polarization.

The present invention combines an off-axis optical system, fixed or gimbaled, whose entrance pupil looks through an off-axis segment of the optical window with a polarizer that is positioned in the optical path between the optical window and a detector. The polarizer comprises at least one filter pixel that imparts a linear polarization of a certain angular value to filter the incident radiation as a function of the polarization of the incident radiation. At least one filter pixel is aligned to the P-polarization in the plane of incidence. The at least one filter pixel modulates the intensity of incident radiation as a function of its P-polarization. Because the target light is more p-polarized than the window light, this increases a contrast ratio of target light (radiation) to window light (radiation), which increases the SNR at the detector.

If the polarizer is a sheet polarizer (effectively one large filter pixel), the sheet polarizer is aligned to the P-polarization in the plane of incidence. The sheet polarizer modulates the intensity of incident radiation, both target radiation and self-emitted radiation, as a function of its P-polarization. This increases the contrast ratio of target radiation to self-emitted radiation, hence the SNR of the radiance image.

If the polarizer is a microgrid polarizer, at least one filter pixel and preferably multiple filter pixels in each sub-array are aligned to the P-polarization in the plane of incidence. For example, for a standard a 2×2 sub-array of linear polarizers having angular values of $\Theta_1=0°$, $\Theta_2=45°$, $\Theta_3=90°$ and $\Theta_4=135°$, the angular value of one of the pixels is aligned to the plane of incidence. Another 2×2 sub-array may have angular values of, for example, $\Theta_1=0°$, $\Theta_2=X°$, $\Theta_3=Y°$ and $\Theta_4=0°$ where 0° is aligned to the plane of incidence providing 2 pixels with higher SNR. The angular values X and Y are suitably selected to minimize the condition number (CN) of the data reduction matrix (DRM) subject to the constraint that 2 of the 4 pixels are aligned to the plane of incidence. There is a direct tradeoff between the number of pixels that have the same angular value and are aligned to the plane of incidence to improve SNR and the number of pixels having different angular values to improve polarization diversity. The size of the sub-array and the angular values may be optimized assuming perfect alignment between the microgrid polarizer and the FPA or, as described in co-pending patent application Ser. No. 14,836, 305 entitled "Polarized Pixelated Filter Array with Reduced Sensitivity to Misalignment for Polarimetric Imaging" filed Aug. 26, 2015 to account for misalignment.

Generally speaking, the outputs Px of an FPA pixel corresponding to a polarizer at angle x in each sub-array can be processed to produce a radiance image (albeit at a reduced resolution) by averaging the outputs Px in each sub-array, to produce an angle of linear polarization (AoLP) image e.g., for a 2×2 sub-array AoLP=0.5*a tan((P0−P90)/(P45−P135)) and to produce a degree of linear polarization (DoLP) image e.g., for a 2×2 sub-array DoLP=sqrt((P0−P90)^2+(P45−P135)^2)/(P0+P90) assuming a standard 2×2 sub-array. The optical window and polarization filtering can create a p-polarization bias in the AoLP and DoLP images. This bias can be mitigated or removed by calibrating the data reduction matrix for the microgrid polarizer.

In the case of non-uniform aero-thermal heating of the optical window, which produces a gradient in the incident radiance, it is important to note that the AoLP image will remove any gradient that has the same value for each 2×2 sub-array in addition to the back ground window self-emissions, whereas the radiance image and DoLP image will not. In certain extreme cases, the AoLP image will be the only data product used to track a target.

Combinations of the sheet polarizer, the microgrid polarizer and a transmissive element may be implemented using a mechanical shutter or a dynamic microgrid array. The sheet polarizer may be used with imaging or non-imaging detectors whereas the microgrid polarizer is only applicable with imaging detectors.

Figure 3:
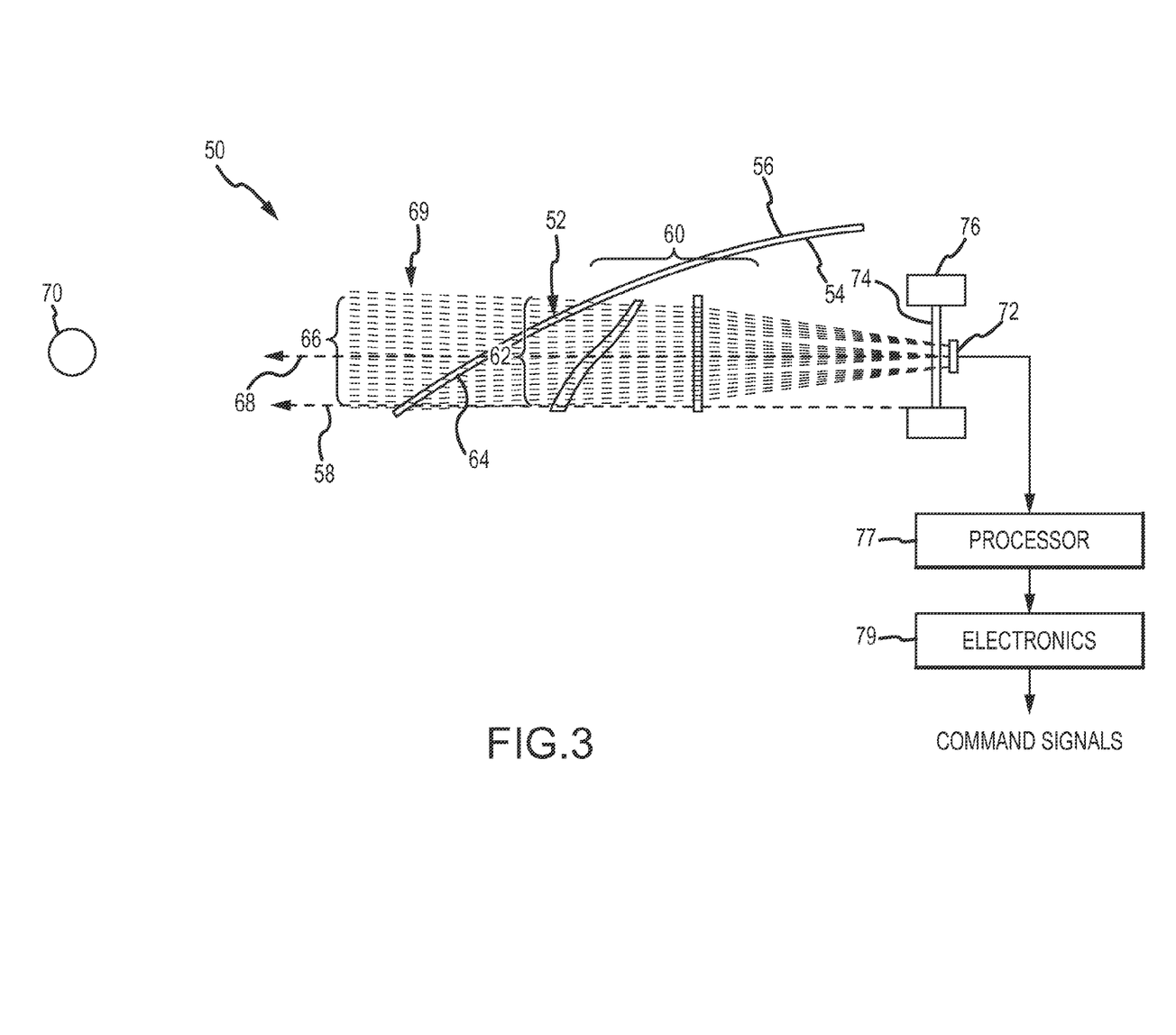
FIG. 3 is a diagram of a fixed optical system including a polarizer aligned, at least in part, to the P-polarization in the plane of incidence.

Referring now to FIG. 3, an embodiment of an optical system 50 comprises an optical window 52 having interior and exterior surfaces 54 and 56, respectively, with a curvature with respect to and symmetric about a central axis 58. The optical window 52 may have a hemispherical or conformal shape. Typically, hypersonic weapons have a conformal shape with a relatively high AOI for aerodynamic considerations. The optical window may be formed from Germanium or a Nanocomposite Optical Ceramic (NCOC) material that is substantially transmissive in the MWIR.

Fixed focusing optics 60 have an entrance pupil 62 that is offset from central axis 58 to look through an off-axis segment 64 of optical window 52 such that a field-of-view (FOV) 66 does not cross central axis 58 behind optical window 52. Focusing optics 60 is suitably configured to provide optical correction for distortion produced by passing through the optical window, route the incident radiation along an optical path (optic axis) 68 and focus the incident radiation at a focal plane. Focusing optics 60 may include corrective optic elements, focusing elements and turning mirrors, for example. Focusing optics 60 capture incident radiation 69 from a distant target 70 and self-emitted radiation from the off-axis segment 64 of the window.

A detector 72 at or near the focal plane generates a signal(s) responsive to the intensity of incident radiation in a spectral band (e.g., the MWIR band). The detector may, for example, be a quad-cell detector for non-imaging applications such as spot tracking. The quad-cell generates four signals responsive to the intensity of the incident radiation on each cell that are processed to generate an angle to the target. The detector may, for example, be a focal plane array (FPA) for various imaging applications. The FPA generally includes an array of pixels, each pixel including a photo-detector that generates a signal responsive to the intensity of the incident radiation. Detectors are not responsive to the polarization of the incident radiation. The detector may include a read out IC (ROIC) to readout the signals.

A polarizer 74 is positioned in optical path 68 between the off-axis segment 64 of optical window 52 and detector 72. Polarizer 74 e.g., a sheet polarizer or microgrid polarizer comprises at least one filter pixel that imparts a linear polarization of a certain angular value to filter the incident radiation 69 as a function of its polarization. The sheet polarizer can be positioned anywhere along the optical path whereas a microgrid polarizer must be positioned at the FPA or an intermediate image of the focal plane. A mechanism 76 fixes the alignment of the at least one filter pixel to the p-polarization in the plane of incidence such that the polarizer prefers the target radiation to the self-emitted window radiation. This increases the contrast of the target radiation to the self-emitted window radiation, hence the SNR at the detector. Mechanism 76 may, for example, a mounting bracket and bolts to secure the polarizer 74.

A processor(s) 77 processes the signal to generate data produces. For a sheet polarizer, the processor generates a radiance image. For a microgrid polarizer, the processor may generate a radiance image, an AoLP image and a DoLP image. Electronics 78 use the data products to track the target and provide command signals to guide the hypersonic weapon towards the target. Electronics 78 may be configured to use only the AoLP image.

Figure 4A:
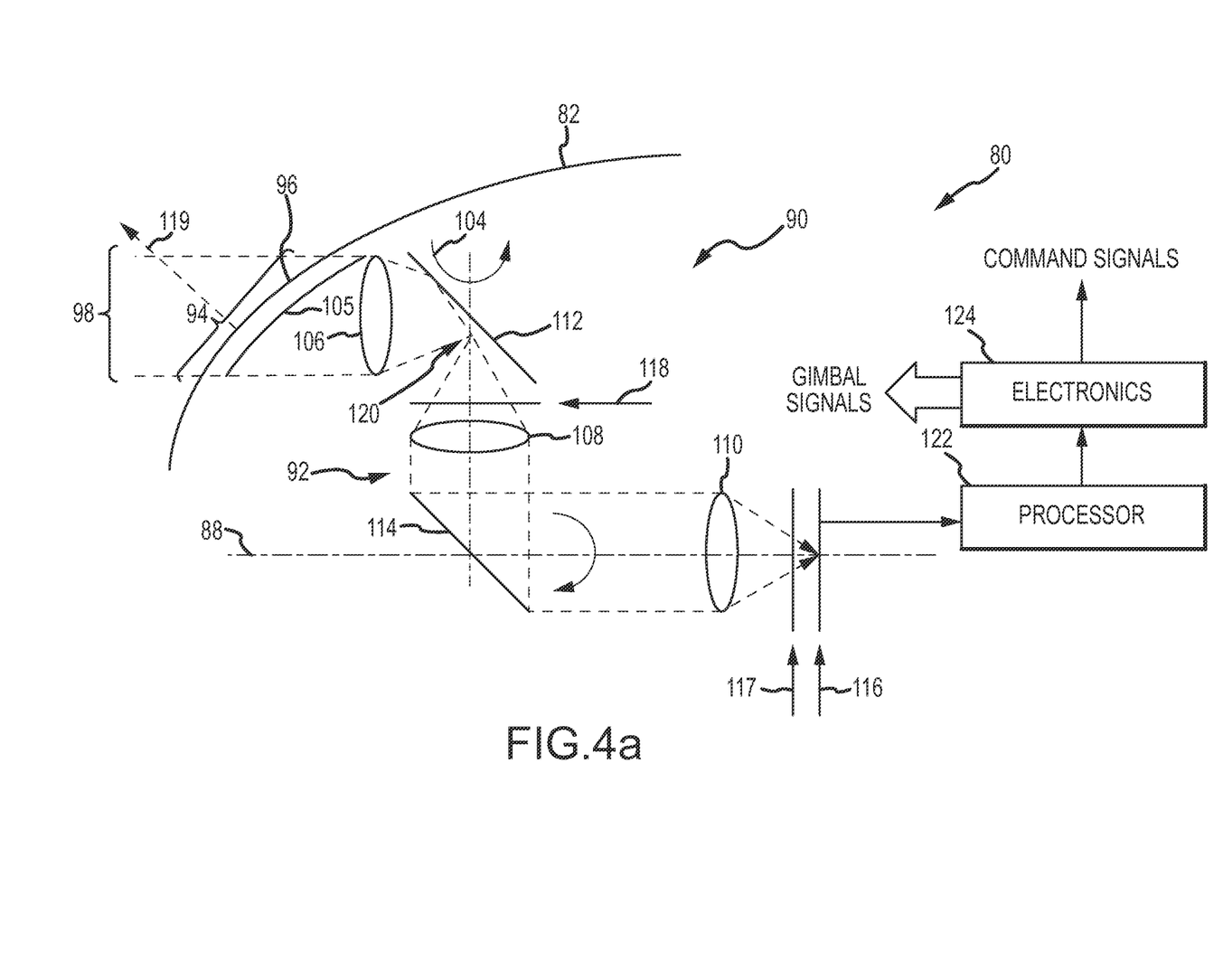
FIGS. 4a and 4b are a notional diagram and different views of a mechanical diagram of a roll-nod gimbaled optical system including a polarizer, on or off-gimbal, aligned, at least in part, to the P-polarization in the plane of incidence.
Figure 4B:
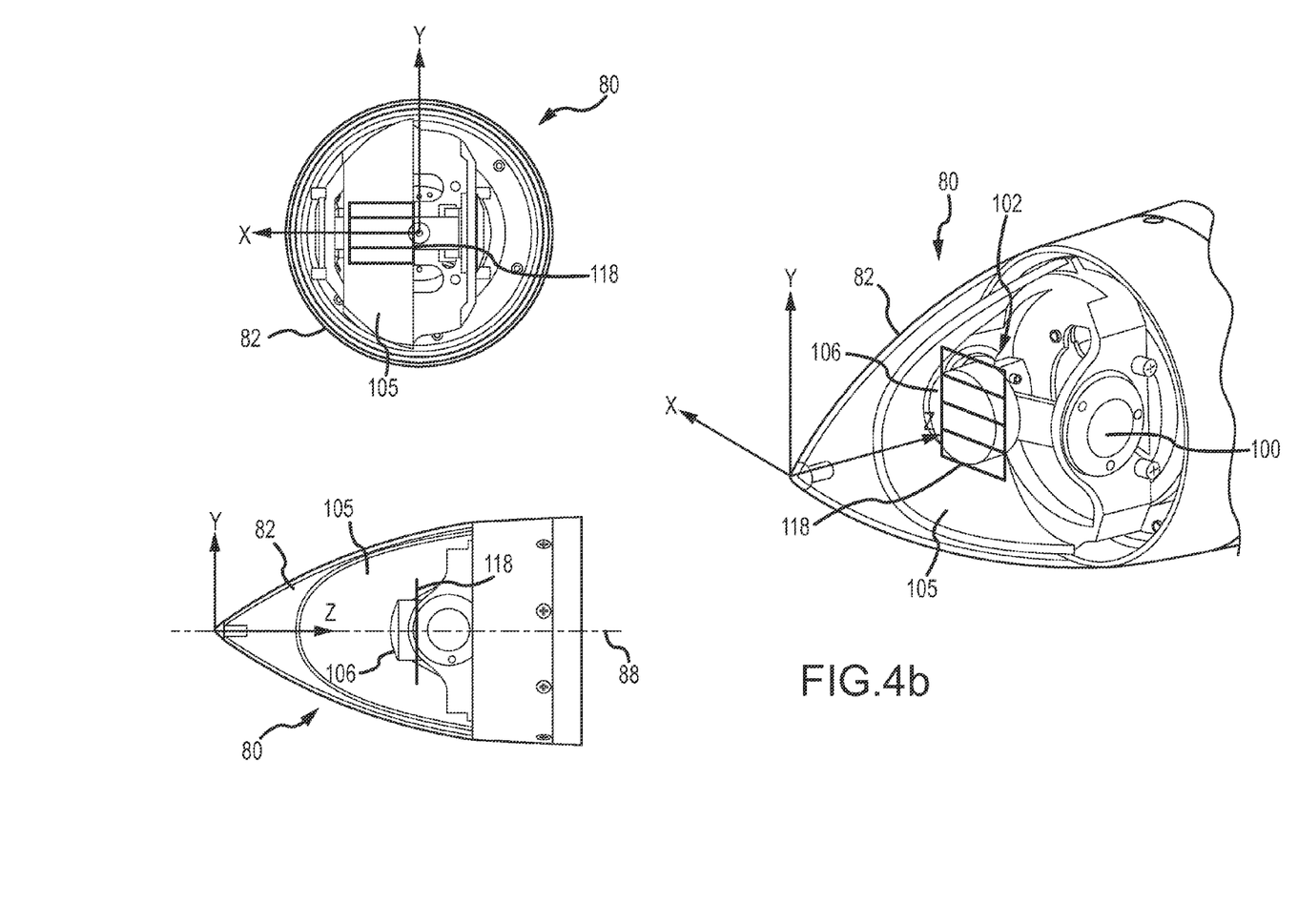

Referring now to FIGS. 4a and 4b, an embodiment of an optical system 80 comprises an optical window 82 having interior and exterior surfaces with a curvature with respect to and symmetric about a central axis 88. Focusing optics 90 are mounted on a two-axis (roll/nod) gimbal 92 that rotates the optics' entrance pupil 94 to look through different off-axis segments 96 of the optical window to sweep a FOV 98 over a larger field-of-regard. The optics and entrance pupil are offset from the central axis 88 and rotated through allowed angles in roll and nod such that the FOV 98 does not cross central axis 88 behind the optical window.

In this embodiment, two-axis gimbal 92 comprises a roll gimbal 100 that is driven to rotate about a roll axis coincident with central axis 88 and a nod gimbal 102 mounted on the roll gimbal and driven to rotate about a nod axis 104 that is perpendicular or skew to central axis 88. Each gimbal includes the rotating gimbal and a drive motor to affect rotation. Focusing optics 90 includes optical focusing or corrector elements 105, 106, 108 and 110 and turning mirrors 112 and 114 mounted on-gimbal to collect incident radiation within the entrance pupil, correct, focus and route the incident radiation along an optical path to a focal plane.

A polarizer is positioned in optical path between the off-axis segment 96 of optical window and a detector 116 (e.g., quad-cell or FPA) positioned at or near the focal plane. In a first embodiment, a polarizer 117 may be positioned off-gimbal. If polarizer 117 is a sheet polarizer it can be positioned at any arbitrary position along the optical path. If polarizer 117 is a microgrid polarizer it must be positioned at the FPA or an intermediate image of the focal plane. If off-gimbal, the polarizer is only aligned to the plane of incidence (as defined by surface normal 119 to the optical window) at a specified roll/nod orientation (e.g., 0°, 0°) and an orientation 180° out of phase (e.g., 180°, 180°). To read out the detector, the gimbal is rotated to one of these two positions. The "mechanism" for aligning the polarizer is thus implemented by the nod gimbal and rotation of the nod gimbal. As will be discussed further, if the sheet polarizer is implemented with a dynamic microgrid array, that array may be reconfigurable to rotate with the gimbal to maintain alignment to the plane of incidence.

In a second embodiment, a polarizer 118 is positioned on the nod gimbal 102 ("on-gimbal"). If polarizer 118 is a sheet polarizer it can be positioned anywhere in the optical path on the nod gimbal and optically aligned to the plane of incidence, and remains in the plane of incidence as the roll and nod gimbals rotate about their respective axes. As shown in FIG. 4b, the lines of the sheet polarizer indicate the direction of the pass axis. If polarizer 118 is a microgrid polarizer it must be positioned at an intermediate image 120 of the focal plane on the nod gimbal and optically aligned to the plane of incidence, and remains in the plane of incidence as the roll and nod gimbals rotate about their respective axis.

A processor(s) 122 processes the signal to generate data produces. For a sheet polarizer, the processor generates a radiance image. For a microgrid polarizer, the processor may generate a radiance image, an AoLP image and a DoLP image. Electronics 124 use the data products to track the target and provide command signals to guide the hypersonic weapon towards the target. Electronics 124 may be configured to use only the AoLP image. If polarizer 117 is mounted off-gimbal, electronics 124 generate gimbal signals for the drive motors to rotate the gimbals to align the plane of incidence to the polarizer to read out the detector.

Figure 5A:
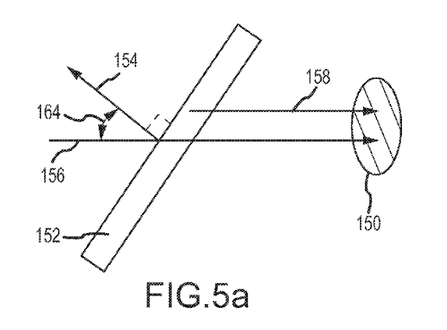
FIGS. 5a, 5b and 5c are a diagram of a sheet polarizer aligned to the plane of incidence, a plot illustrating the improvement in SNR with the % polarization of the target and optical window and radiance images of the target with and without the sheet polarizer, respectively.
Figure 5B:
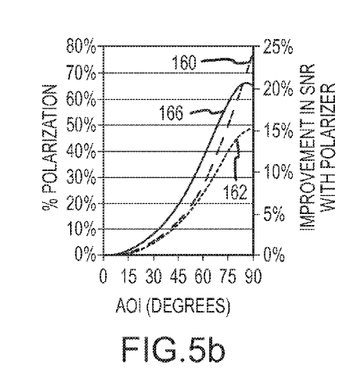

Referring now to FIGS. 5a, 5b and 5c, a sheet polarizer 150 is positioned in the optical path behind an off-axis segment 152 of the optical window and aligned to the plane of incidence as defined by a surface normal 154 to the off-axis segment. Light 156 from a target is p-polarized by passing through both the inner and outer surfaces of off-axis segment 152. Light 158 that is self-emitted by off-axis segment 152 is p-polarized by pass through only the inner surface. The percentage of p-polarization 160 of target light 156 is thus greater than the percentage of p-polarization 162 of window light 158. The degree of p-polarization, and thus the difference in p-polarization increases as the angle of incidence 164 gets larger. The difference is suitably at least 5%.

Since sheet polarizer 150 is aligned to the plane of incidence it prefers p-polarized light. As a result, a greater portion of target light 156 is passed through the polarizer than window light 158, thus increasing the contrast of target light to window light and SNR 166 at the detector. As shown, the SNR 166 at the detector also increases with increasing AOI.

Figure 5C:
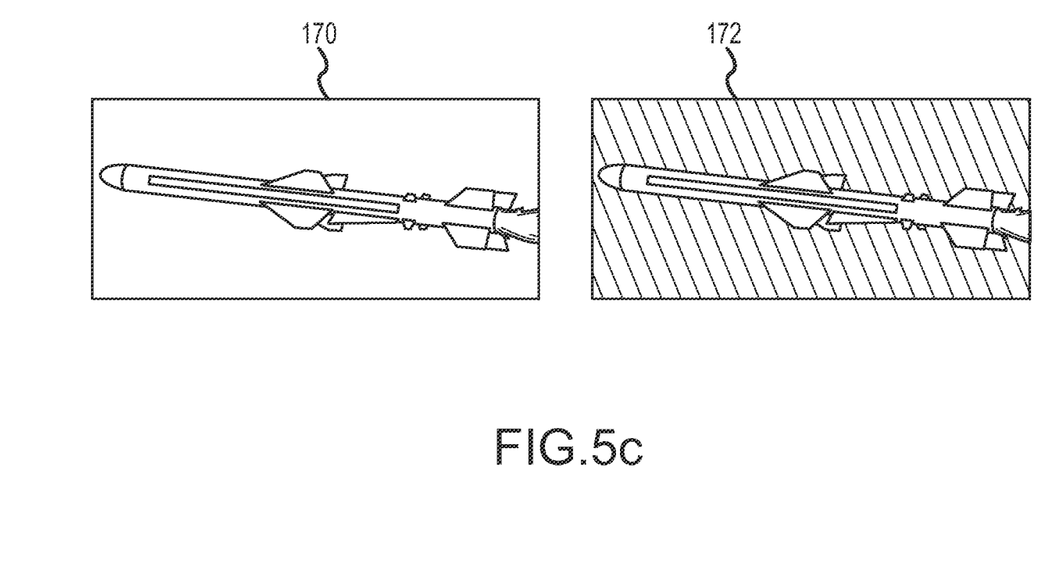

As shown in FIG. 5c, left and right sided images 170 and 172, respectively, are of untiltered radiation (no polarizer) and p-polarization filtered radiation (sheet polarizer). Without the polarizer the background appears grey whereas with the polarizer the background appears black, which accounts for the improvement in SNR for the target in the scene. The improvement in SNR may allow the electronics to track the target notwithstanding the extreme aero-thermal heating of the optical window.

Figure 6:
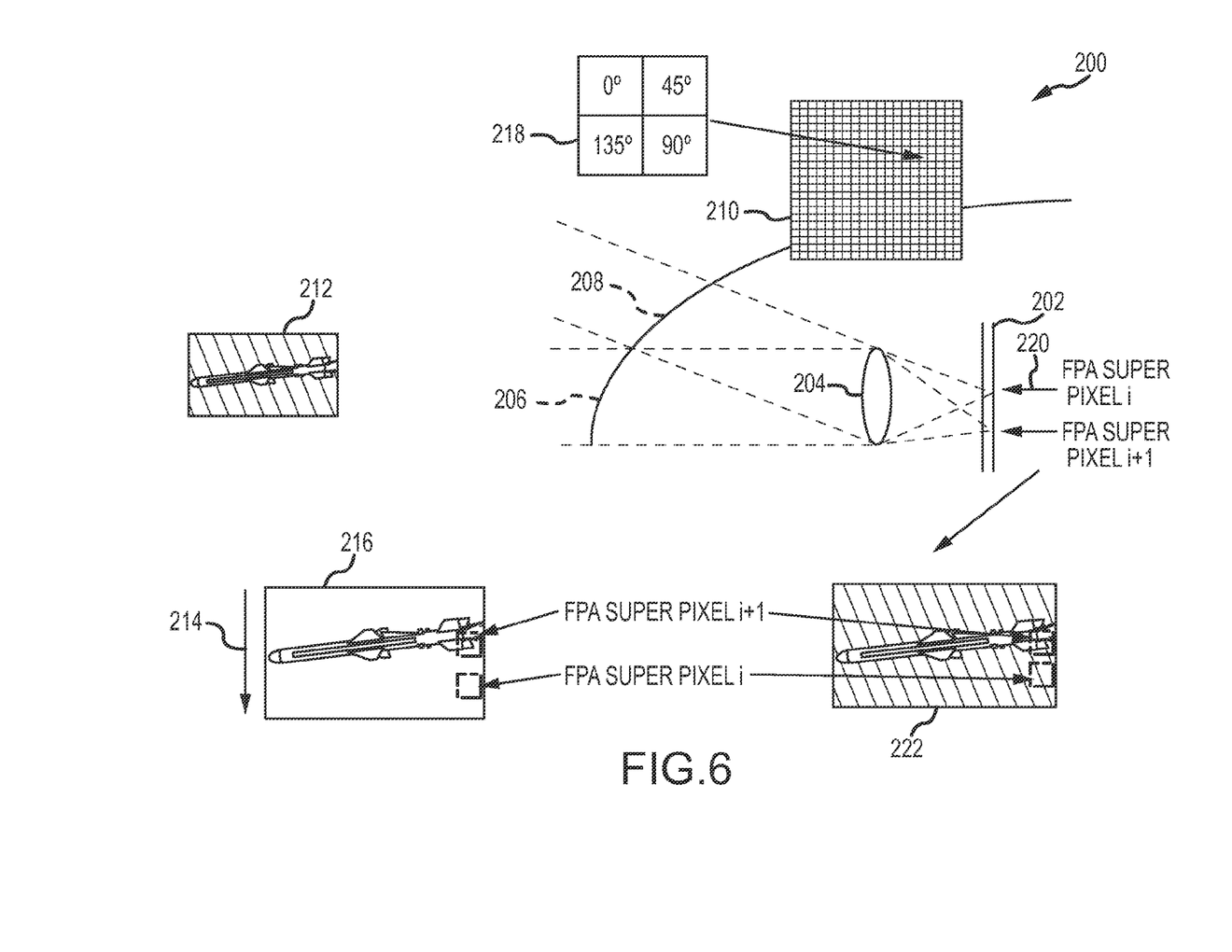
FIG. 6 is a diagram of a microgrid polarizer on a roll-nod gimbal, radiance and AoLP images illustrating the removal of a gradient due to non-uniform aero-thermal heating of the optical window.

Referring now to FIG. 6, a microgrid polarizer 200 is mounted on or off-gimbal in the optical path at a FPA 202 or an intermediate image of the focal plane. The gimbal rotates an entrance pupil 204 of the optics to look through different off-axis segments 206 and 208 of optical window 210 at a target 212. Segment 206 at the tip of the optical window is heated to a higher temperature than segment 208. The difference in temperature produces a gradient 214 in the radiance image 216 of the target.

Microgrid polarizer 200 comprises an array of polarized pixelated filter sub-arrays 218. Each sub-array 218 comprises three or more filter pixels Q of which at least two filter pixels impart a linear polarization of a certain and different angular value. In this embodiment, each sub-array is a 2×2 grouping of filter pixels that impart linear polarizations of 0°, 45°, 90° and 135°, respectively, with one linear polarization aligned to the P-polarization in the plane of incidence. The FPA pixels are grouped into 2×2 super pixels 220 corresponding to each sub-array.

The outputs of a FPA super pixel in each sub-array can be processed to produce data products. Assuming that any gradient is constant over a 2×2 pixel grouping, each pixel output within a super pixel includes a Px contribution at angle x for target radiation and a constant contribution W for window radiation. A radiance image (albeit at a reduced resolution) is computed by averaging the outputs Px in each sub-array as RAD=0.25*((P0+W)+(P45+W)+(P90+W)+(P135+W)). As such, the radiance image includes the window radiance component. An angle of linear polarization (AoLP) image 222 is computed as AoLP=0.5*a tan(((P0+W)−(P90+W))/((P45+W)−(P135+W)))=0.5*a tan((P0−P90)/(P45−P135)). As such the radiance component of the window self-emissions, and thus any gradient component is canceled in the AoLP image. A degree of linear polarization (DoLP) image is calculated as DoLP=sqrt((P0−P90)^2±(P45−P135)^2)/(P0+P90+2 W). The DoLP image includes the window radiance component. Thus, in cases of extreme aero-thermal heating, the AoLP image may be the only useful data product. Each of the data products can, to some extent, be improved by aligning one or more of the polarization pixels to the plane of incidence to improve the contrast of target radiance to window radiance.

Figure 7:
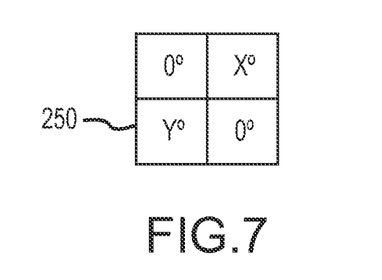
FIG. 7 is a diagram of a 2×2 sub-array of the microgrid polarizer in which two pixels are arbitrarily assigned a 0° linear polarization that is aligned to the P-polarization in the plane of incidence.
Figure 8A:
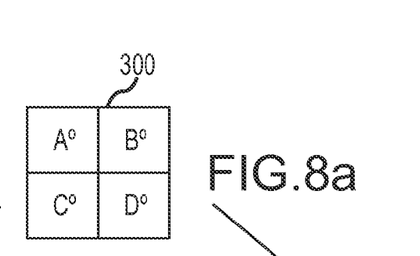
FIGS. 8a through 8d are diagrams illustrating a dynamic microgrid array in which the arbitrary filter pixel values can be set all to the same value to form a sheet polarizer, different values to form a microgrid polarizer or all to unpolarized states to form a non-polarized element.
Figure 8B:
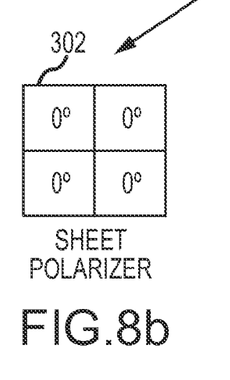
Figure 8C:
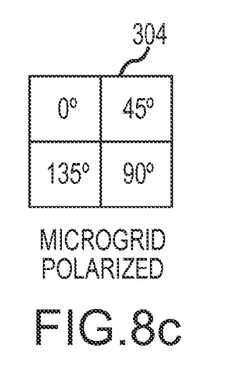
Figure 8D:
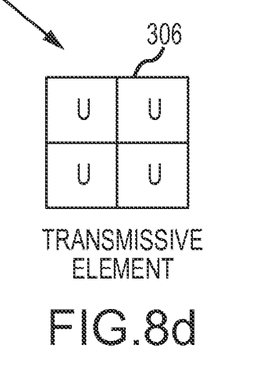

Referring now to FIG. 7, in an embodiment a sub-array 250 of a microgrid polarizer includes a 2×2 grouping of filter pixels Q of which at least two filter pixels impart a linear polarization of a certain and different angular value, and a third pixel either is unpolarized or imparts a linear polarization of a different angular value. The fourth pixels is not required to create the AoLP and DoLP data products but can be used to either increase the polarization diversity, thus improving the AoLP and DoLP data products or to increase SNR. As shown, two of the pixels impart a linear polarization of 0° and the other two pixels impart linear polarizations of X° and Y°. The microgrid polarizer is aligned such that the 0° linear polarization lies in the plane of incidence to pass p-polarized light. Note, the assignment of 0° for alignment to the plane of incidence is arbitrary, any value of linear polarization could be so aligned. The values of X and Y are selected to provide diversity of polarization. In alternate embodiments, the sub-array may be larger than 2×2, in which case more than 2 pixels may have the same angular value that is aligned to the plane of incidence. The tradeoff is between SNR and polarization diversity.

Referring now to FIGS. 8a-8d, in an embodiment the polarizer may be implemented as a dynamic microgrid array 300 in which the individual pixels can be selectively configured to impart a linear polarization with different angular values or to be unpolarized. The array could be configured as a sheet polarizer 302 by setting all of the angular values to the same value. The array could be configured as a sub-array 304 of a microgrid polarizer by setting the angular values to different values. The array could be configured as a transmissive element 306 by setting all the pixels to be unpolarized "U". If the polarizer is mounted off-gimbal, the angular values could be updated to effectively rotate the polarizer in sync with the rotation of the entrance pupil to maintain alignment of the polarizer to the plane of incidence. An embodiment of a dynamic microgrid array is disclosed in U.S. patent application Ser. No. 14/291,098 entitled "Dynamic Polarizer" filed May 30, 2015, which is hereby incorporated by reference.

In certain applications, the dynamic microgrid array could be reconfigured between a sheet polarizer, a microgrid polarizer and the transmissive element as a function of mission conditions. For example, if the unfiltered radiance provides sufficient SNR to track the target, the dynamic microgrid array may be configured as a transmissive element. If the SNR falls below the minimum threshold, the dynamic microgrid array may be reconfigured as the sheet polarizer or the microgrid polarizer.

Figure 9:
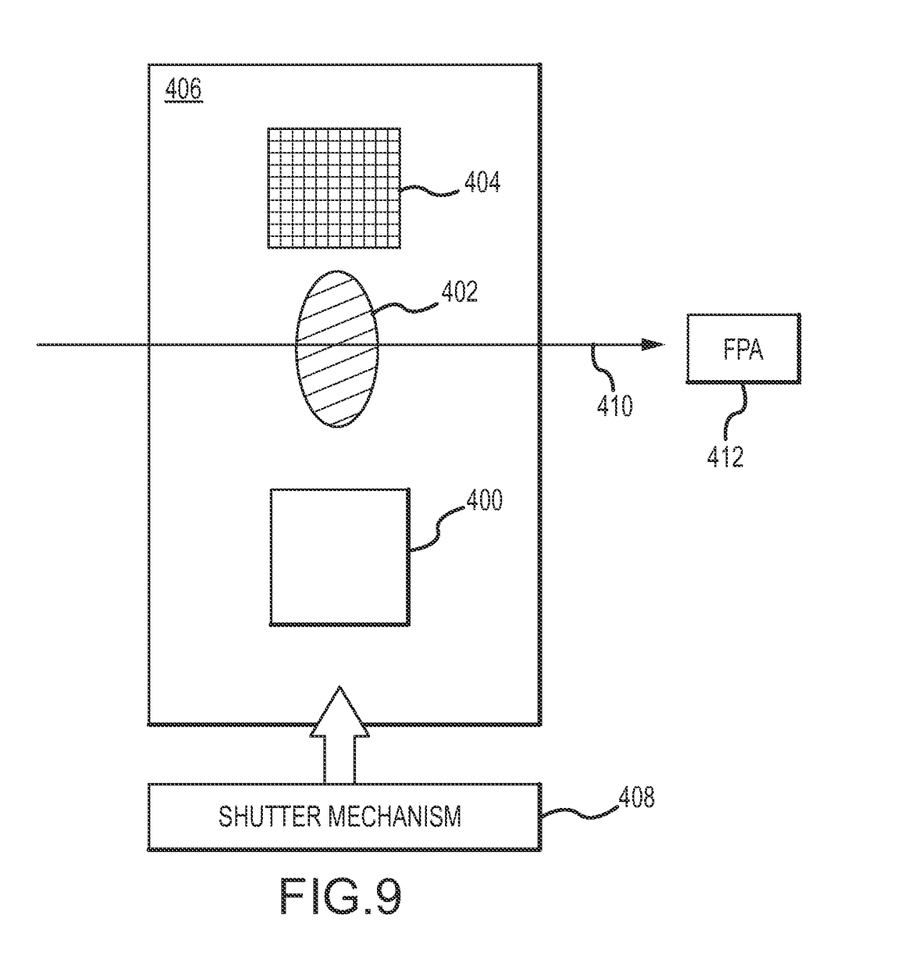
FIG. 9 is a diagram of an embodiment of an optical imaging system using a shutter mechanism to selective place a sheet polarizer, a microgrid polarizer or a transmissive element in the optical path.

Referring now to FIG. 9, in an embodiment a fixed transmissive element 400, a fixed sheet polarizer 402 and a fixed microgrid polarizer 404 are mounted on a carrier 406 in a fixed optical system or on or off-gimbal in a gimbaled optical system. A shutter mechanism 408 selectively actuates carrier 406 to move one of the transmissive element 400, sheet polarizer 402 and microgrid polarizer 404 into an optical path 410 to an FPA 412.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An optical system for use with a flight vehicle subject to aero-thermal heating, said optical system comprising:
   an optical window having interior and exterior surfaces with a curvature with respect to a central axis, said optical window configured such that incident radiation from a target passes through both said interior and exterior surfaces each of which induces a P-polarization to the incident target radiation within a plane of incidence, said optical window configured to self-emit radiation that passes only through said interior surface which induces a P-polarization to the self-emitted radiation within the plane of incidence, said self-emitted radiation overlapping the spectrum of the target radiation;
   focusing optics comprising an entrance pupil offset from the central axis to look through an off-axis segment of the optical window, said focusing optics configured to route incident radiation along an optical path and focus the incident radiation at a focal plane;
   a detector at or near the focal plane configured to sense incident radiation;
   a polarizer positioned in the optical path between the optical window and the detector, said polarizer comprising at least one filter pixel that imparts a linear polarization of a certain angular value to filter the incident radiation as a function of the polarization of the incident radiation; and
   a mechanism configured to align said at least one filter pixel to the P-polarization within the plane of incidence.

2. The optical system of claim 1, further comprising:
   an airframe; and
   a propulsion system configured to propel the airframe towards a target at speeds greater than Mach 5.

3. The optical system of claim 1, wherein said target radiation is at least 5% more P-polarized than said self-emitted radiation.

4. The optical system of claim 1, wherein said polarizer comprises a sheet polarizer having only a single filter pixel, said mechanism fixing the alignment of said sheet polarizer to pass P-polarized radiation in the plane of incidence thereby modulating the intensity of incident radiation as a function of its P-polarization and increasing a contrast ratio of target radiation to self-emitted radiation.

5. The optical system of claim 1, wherein said polarizer comprises a sheet polarizer having only a single filter pixel, said optical system further comprising:
   an outer gimbal configured to rotate about a first rotation axis; and
   an inner gimbal mounted on the outer gimbal, said inner gimbal configured to rotate the entrance pupil about a second rotation axis perpendicular or skew to the first rotation axis,
   said mechanism mounting the sheet polarizer on the inner gimbal in alignment to the P-polarization in the plane of incidence and remaining aligned as the outer and inner gimbals rotate about the first and second rotation axes, respectively.

6. An optical system for use with a flight vehicle subject to aero-thermal heating, said optical system comprising:
   an optical window having interior and exterior surfaces with a curvature with respect to a central axis, said optical window configured such that incident radiation from a target passes through both said interior and exterior surfaces each of which induces a P-polarization to the incident target radiation within a plane of incidence, said optical window configured to self-emit radiation that passes only through said interior surface which induces a P-polarization to the self-emitted radiation within the plane of incidence, said self-emitted radiation overlapping the spectrum of the target radiation;
   focusing optics comprising an entrance pupil offset from the central axis to look through an off-axis segment of the optical window, said focusing optics configured to route incident radiation along an optical path and focus the incident radiation at a focal plane;
   a detector at or near the focal plane configured to sense incident radiation, wherein the detector comprises a pixelated focal plane array (FPA);
   a polarizer positioned in the optical path between the optical window and the detector, wherein the polarizer comprises a microgrid polarizer array having a plurality of polarized pixelated filter sub-arrays positioned at the FPA or an intermediate image of the focal plane, each sub-array comprising three or more filter pixels Q of which at least two filter pixels impart a linear polarization of a certain and different angular value to filter the incident radiation as a function of the polarization of the incident radiation;
   a mechanism configured to align the microgrid polarizer array such that at least one of the filter pixels that imparts a linear polarization is aligned to the P-polarization in the plane of incidence; and
   a processor configured to read out and process multiple groupings of three or more FPA pixels L<=Q to compute an Angle of Linear Polarization (AoLP) image, wherein Q is defined as the number of filter pixels in each said sub-array and L is defined as the number of FPA pixels in each said grouping.

7. The optical system of claim 6, wherein each sub-array comprises at least two filter pixels that are aligned to the P-polarization in the plane of incidence.

8. The optical system of claim 6, wherein each sub-array is a 2×2 array of filter pixels that impart linear polarizations of 0, 45, 90 and 135 degrees, respectively, with one said linear polarization aligned to the P-polarization in the plane of incidence.

9. The optical system of claim 6, wherein a data reduction matrix for the microgrid polarizer is calibrated to reduce P-polarization bias in the AoLP image.

10. The optical system of claim 6, wherein the microgrid polarizer is positioned off-gimbal at the FPA, said mechanism fixing the alignment the microgrid polarizer array such that at least one of the filter pixels that imparts a linear polarization is aligned to the P-polarization in the plane of incidence.

11. The optical system of claim 6, further comprising:
   an outer gimbal configured to rotate about a first rotation axis; and an inner gimbal mounted on the outer gimbal, said inner gimbal configured to rotate the entrance pupil about a second rotation axis perpendicular or skew to the first rotation axis, said mechanism mounting the microgrid polarizer on the inner gimbal at an intermediate image of the focal plane, said microgrid polarizer mounted such that said at least one filter pixel is aligned to the P-polarization in the plane of incidence and remains aligned as the outer and inner gimbals rotate about the first and second rotation axes, respectively.

12. The optical system of claim 6, further comprising;
an outer gimbal configured to rotate about a first rotation axis; and
an inner gimbal mounted on the outer gimbal, said outer gimbal configured to rotate the entrance pupil about a second rotation axis perpendicular or skew to the first rotation axis,
said mechanism mounting the microgrid polarizer off-gimbal at the FPA such that said at least one filter pixel is aligned to the P-polarization in the plane of incidence at known angular positions of the inner and outer gimbal, said mechanism configured to rotate the outer and inner gimbals to the known angular positions to readout the sensed incident radiation from the FPA.

13. The optical system of claim 1, wherein said polarizer comprises a dynamic microgrid array having a plurality of switchable polarized filter pixels.

14. The optical system of claim 13, wherein said dynamic microgrid array is configurable to switch all of the polarized filter pixels to the same certain angular value to pass P-polarized radiation and to switch the polarized filter pixels to form plurality of polarized pixelated filter sub-arrays, each sub-array comprising three or more filter pixels Q of which at least two filter pixels impart a linear polarization of a certain and different angular value of which at least one filter pixel is aligned to pass P-polarized radiation, wherein Q is defined as the number of filter pixels in each said sub-array.

15. The optical system of claim 13, wherein the dynamic microgrid array is configurable to switch all of the polarized filter pixels to an unpolarized state.

16. The optical system of claim 1, wherein said polarizer comprises a sheet polarizer that is aligned to pass P-polarized radiation and a microgrid polarizer array having a plurality of polarized pixelated filter sub-arrays, each sub-array comprising three or more filter pixels Q of which at least two filter pixels impart a linear polarization of a certain and different angular value where Q is defined as the number of filter pixels in each said sub-array, further comprising:
a shutter mechanism configured to selectively move either the sheet polarizer or the microgrid polarizer array into an optical path leading to the FPA; and
a processor configured to read out and process FPA pixels to compute an intensity image when the sheet polarizer is in the optical path and to compute an Angle of Linear Polarization (AoLP) image when the microgrid polarizer array is in the optical path.

17. The optical system of claim 16, wherein the shutter mechanism is configured to selectively remove both of the sheet polarizer and the microgrid polarizer array from the optical path.

18. An optical system for use with a flight vehicle subject to aero-thermal heating, said optical system comprising:
an optical window having interior and exterior surfaces with a curvature with respect to a central axis, said optical window configured such that incident radiation from a target passes through both said interior and exterior surfaces each of which induces a P-polarization to the incident target radiation within a plane of incidence, said optical window configured to self-emit radiation that passes only through said interior surface which induces a P-polarization to the self-emitted radiation within the plane of incidence, said self-emitted radiation overlapping the spectrum of the target radiation;
an outer gimbal configured to rotate about a first rotation axis coincident with the central axis;
an inner gimbal mounted on the outer gimbal, said inner gimbal configured to rotate about a second rotation axis perpendicular to the first rotation axis;
focusing optics comprising an entrance pupil mounted on the inner gimbal offset from the central axis to look through an offset segment of the optical windows as said inner and outer gimbals rotate, said focusing optics configured to route incident radiation along an optical path across the gimbals and focus the incident radiation at an off-gimbal focal plane;
a detector mounted off-gimbal at or near the focal plane configured to sense incident radiation;
a polarizer positioned in the optical path on the nod gimbal, said polarizer comprising at least one filter pixel that imparts a linear polarization of a certain angular value to filter incident radiation as a function of the polarization of the incident radiation, said polarizer mounted such that said at least one filter pixel is aligned to the P-polarization in the plane of incidence and remains aligned as the outer and inner gimbals rotate about the first and second rotation axes, respectively.

19. The optical system of claim 18, wherein the polarizer comprises a sheet polarizer having only a single filter pixel.

20. The optical system of claim 18, wherein the polarizer comprises a microgrid polarizer array having a plurality of polarized pixelated filter sub-arrays positioned at an intermediate image of the focal plane, each sub-array comprising three or more filter pixels Q of which at least two filter pixels impart a linear polarization of a certain and different angular value where Q is defined as the number of filter pixels in each said sub-array.

21. A hypersonic weapon, comprising:
an airframe;
a propulsion system configured to propel the airframe towards a target at speeds greater than Mach 1;
an optical window having interior and exterior surfaces with a curvature with respect to a central axis, said optical window configured such that incident radiation from the target passes through both said interior and exterior surfaces each of which induces a P-polarization to the incident target radiation within a plane of incidence, said optical window configured to self-emit spatially non-uniform radiation due to non-uniform aero-thermal heating that passes only through said interior surface which induces a P-polarization to the self-emitted radiation within the plane of incidence, said self-emitted radiation overlapping the spectrum of the target radiation;
focusing optics comprising an entrance pupil offset from the central axis to look through an off-axis segment of the optical window, said focusing optics configured to route incident radiation along an optical path and focus the incident radiation at a focal plane;
a pixelated focal plane array (FPA) at or near the focal plane configured to sense incident radiation;

a microgrid polarizer array position in the optical path either at the FPA or at an intermediate image of the focal plane, said microgrid polarizer array having a plurality of polarized pixelated filter sub-arrays, each sub-array comprising three or more filter pixels Q of which at least two filter pixels impart a linear polarization of a certain and different angular value;

a processor configured to read out and process multiple groupings of three or more FPA pixels $L \leq Q$ to compute data products including an Angle of Linear Polarization (AoLP) image; and guidance electronics configured to use only the AoLP image from said data products to track said targets, wherein Q is defined as the number of filter pixels in each said sub-array and L is defined as the number of FPA pixels in each said grouping.

22. The hypersonic weapon of claim 21, wherein the propulsion system is configured to propel the airframe towards a target at speeds greater than Mach 5.

23. The hypersonic weapon of claim 21, wherein each said sub-array comprises at least two filter pixels that impart the linear polarization with the same angular value, further comprising a mechanism for aligning said microgrid polarizer such that said at least two filters with the same angular value are aligned to the P-polarization in the plane of incidence.

* * * * *